United States Patent [19]

Specht et al.

[11] Patent Number: 4,685,190

[45] Date of Patent: Aug. 11, 1987

[54] METHOD OF OPERATING AN APPPARATUS FOR PRODUCING CONVEYER BELTS

[75] Inventors: Hans Specht, Northeim; Walter Käse, Hanover, both of Fed. Rep. of Germany

[73] Assignee: Continental Gummi-Werke Aktiengesellschaft, Hanover, Fed. Rep. of Germany

[21] Appl. No.: 802,862

[22] Filed: Nov. 27, 1985

[30] Foreign Application Priority Data

Dec. 1, 1984 [DE] Fed. Rep. of Germany ....... 3443889

[51] Int. Cl.⁴ .......................................... B65H 23/08
[52] U.S. Cl. ............................. 29/452; 29/DIG. 42; 226/119; 226/195; 242/154
[58] Field of Search ......................... 29/DIG. 42, 452; 226/195, 118, 119; 242/153, 154; 72/205

[56] References Cited

U.S. PATENT DOCUMENTS

| | | | |
|---|---|---|---|
| 3,298,075 | 1/1967 | Shoe | 29/452 X |
| 3,330,457 | 7/1967 | Foster et al. | 226/195 X |
| 3,480,191 | 11/1969 | Van Os | 226/195 X |
| 3,995,551 | 12/1976 | Mitter | 226/195 X |
| 4,341,335 | 7/1982 | Schmid | 226/195 |

FOREIGN PATENT DOCUMENTS

| | | | |
|---|---|---|---|
| 1579102 | 7/1972 | Fed. Rep. of Germany . | |
| 1074456 | 7/1967 | United Kingdom | 226/118 |
| 1163007 | 9/1969 | United Kingdom | 226/195 |

*Primary Examiner*—Howard N. Goldberg
*Assistant Examiner*—Joseph M. Gorski
*Attorney, Agent, or Firm*—Becker & Becker

[57] ABSTRACT

A method of producing steel-wire-reinforced conveyer belts. The steel wires, which are conveyed at a uniform tension through the production apparatus, each have associated with them a respective hydraulic tensioning cylinder. The cylinders, which communicate with one another, are acted upon by a pulsating fluid pressure. In this way, varying movement resistances can be reduced, resulting in extensive uniformity of the tension state of all of the wires.

3 Claims, 1 Drawing Figure

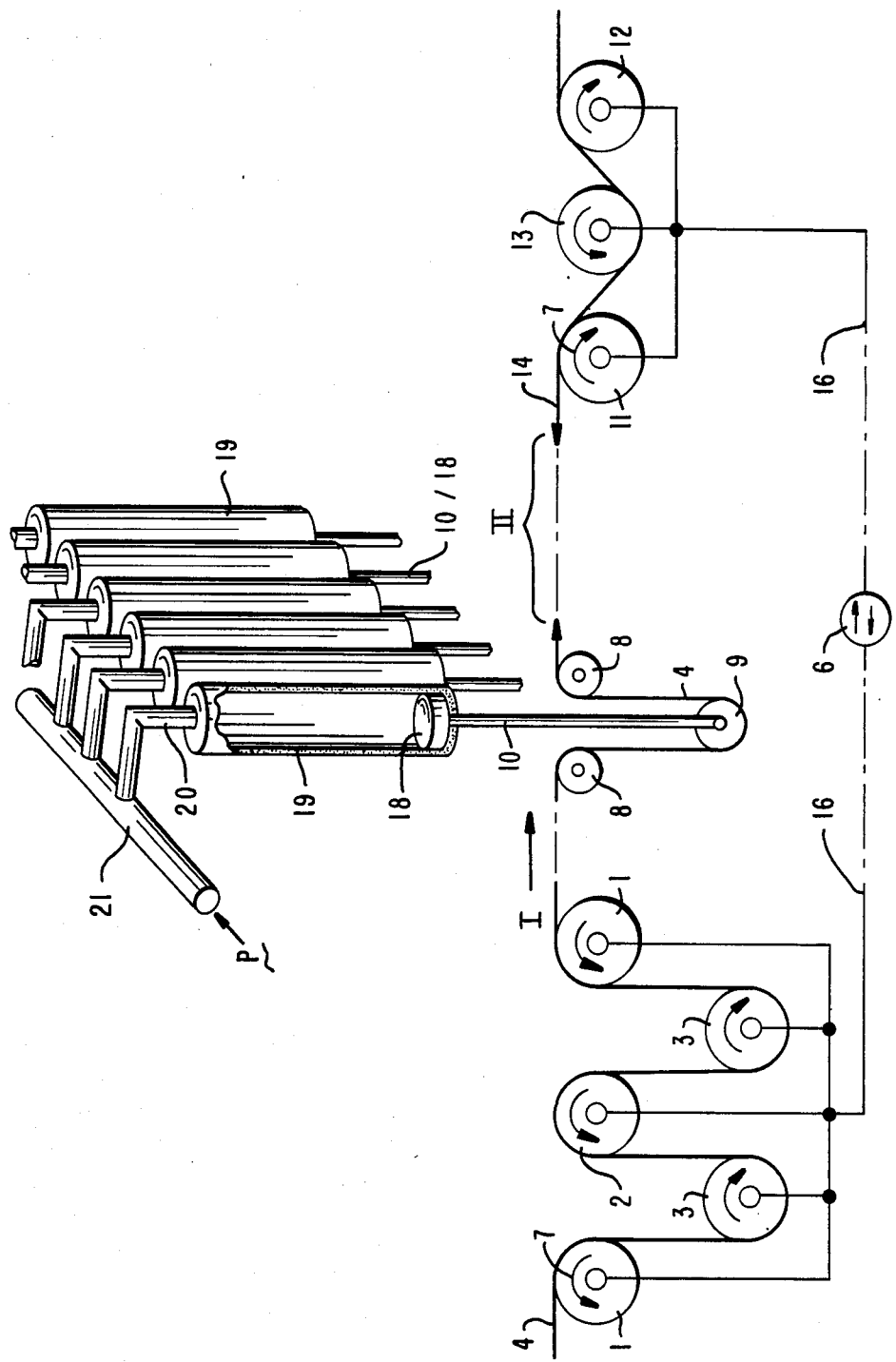

METHOD OF OPERATING AN APPPARATUS FOR PRODUCING CONVEYER BELTS

BACKGROUND OF THE INVENTION

1. Field of the Invention

The present invention relates to a method of operating an apparatus for producing conveyer belts of rubber or rubber-like synthetic material, i.e. elastomeric material, in which are embedded wire or cord-like load-carriers that extend parallel to one another in the longitudinal direction without contacting one another. Means are provided for jointly keeping the load-carriers under tension within a lengthy portion of the apparatus. Also provided are a plurality of tensioning cylinders that are disposed in the vicinity of the input region of the aforementioned portion of the apparatus. Each tensioning cylinder has a piston that can be displaced by pressure medium, with each piston having a piston rod. Provided on each piston rod is a tensioning roller that engages a respective one of the load-carriers.

2. Description of the Prior Art

An apparatus of this general type is known, for example, from German patent No. 1 579 102 Michels et al dated July 13, 1972 and belonging to the assignee of the present invention. After the significance of maintaining a constant tension over the entire length of the apparatus in the load-carriers, not only when progress is halted, but also during the course of the feed movements became known, such apparatus were exclusively preferred over other, continuously operating apparatus, for producing high-quality conveyer belts that contain steel wires. In all cases, the tensioning cylinders that additionally act upon the individual load-carriers constitute an important component, because taken as a whole these cylinders always adjust the different lengths of the load-carriers relative to one another, and hence create the conditions for achieving a uniform tension in all of the load-carriers. Pursuant to generally existing views, and already due to logical considerations, the desired uniform distribution of tension should immediately and automatically result over the width of the load-carrying-containing band that is passed through the apparatus when all of the tensioning cylinders are acted upon by pressure medium from a single source. However, practical experience with the heretofore known apparatus seems to disprove such a theory. In particular, irregularities in the quality of the finished conveyer belts surprisingly occurred continuously. The cause of such irregularities was clearly differences in tension in the embedded load-carriers.

An object of the present invention therefore is to maintain the desired uniform distribution of tension in the load-carriers independent of disruptive external influences, and to thereby indirectly ensure the utility and durability of the conveyer belt that is produced.

BRIEF DESCRIPTION OF THE DRAWING

This object, and other objects and advantages of the present invention, will appear more clearly from the following specification in conjunction with the accompanying drawing, which schematically illustrates one apparatus for producing so-called steel wire conveyer belts pursuant to the method of the present invention; only those components necessary for understanding the invention are shown.

SUMMARY OF THE INVENTION

The method of the present invention includes the steps of: providing means for jointly keeping the load-carriers under tension within a lengthy portion of the apparatus; providing a plurality of tensioning cylinders that are disposed in the vicinity of the input area of the aforementioned portion of the apparatus, with each cylinder having a piston that can be displaced by pressure medium, with each piston having a piston rod; providing on each piston rod a tensioning roller that engages a respective one of the load-carriers; and applying a pulsating pressure, via said pressure medium, to the pistons of the tensioning cylinders. Advantageously, a pulsating pressure is applied that has a frequency between 5 and 20 Hz between an upper and a lower value.

The present invention makes use of the realization, which in the present context is novel and surprising, that the individual tensioning cylinders have considerable differences in their resistance to movement. As shown only by precise tests, the pistons, to which equal pressure is applied in all tensioning cylinders, in no way uniformly follow the tension conditions that change as the load-carriers pass through the apparatus; the pistons also do not completely follow the tension conditions without a time delay. Especially after long down times, the pistons can seize on the cylinder walls in such a way that a stroke movement can be brought about only by an extreme change either in the slack of the wire or in the internal pressure of the cylinder. However, with the inventively pulsating pressure application, it is possible in a simple yet nonetheless effective manner to considerably reduce the response threshold of the tensioning cylinders, and hence to maintain the operating reliability of the tensioning cylinders to an undiminished extent.

Pursuant to one practical embodiment of the inventive concept, it can be advantageous to pulsate the essentially constant pressure of the pressure medium as a function of the tension state of the load-carriers. For example, this can be accomplished in such a way that the pulsation of the pressure medium is produced by deviations of the tension measured in the load-carriers from a desired value.

DESCRIPTION OF PREFERRED EMBODIMENTS

Referring now to the drawing in detail, the apparatus illustrated includes two fixed sets of friction rollers that denote the input and output regions and include between them the essential apparatus stations and treating devices. Disposed directly after the non-illustrated reel frame for the steel wire 4 is the multiple-roller system 1, 2, 3, and disposed in the output region is the three-roller system 11, 12, 13 that can be located approximately between the non-illustrated customary vulcanizing mold or press and a similarly non-illustrated winding station for the finished conveyer belt segments. The steel wires 4, which serve as load carriers, are withdrawn from the reel frame, are looped around the friction rollers 1, 2, 3, and travel in the direction of the arrow I into the actual build-up unit, which is merely indicated by the reference symbol II. In this build-up unit II, the steel wires 4 are overlaid with elastomeric coverings in a known manner in successive treatment steps, and are then conveyed through the vulcanizing press. The vulcanized belt segments 14 leave the apparatus via the friction rollers 11, 12, 13, and are subsequently wound onto storage drums. The two roller systems define a tensioning zone that includes the build-up unit II. The steel wires 4 are subjected to the influence of the tensioning zone as soon as they run up on the rollers 1, 2, 3, and do not leave the tensioning zone until the finished belt segments leave the rollers 11, 12, 13. The operation of the rollers is synchronized, as indicated in the drawing by a common electric or hydraulic motor unit 6 having branched power lines 16. In order to apply the necessary tension on the steel wires 4, the friction rollers are operated in the direction of the arrow 7.

Within the tensioning zone delimited by the two roller systems, each individual steel wire 4 passes through an additional tensioning station which compensates for the unavoidable differences in length that are also caused by thermal processes; the additional tensioning station also uniformly distributes the tension applied by the friction rollers to the steel wires that are combined in a single cord layer. These individual tensioning stations, which are expediently provided immediately after the roller system 1, 2, 3, include a number of single-chamber tensioning cylinders 19 having pistons 18, the piston rods 10 of which are provided with freely rotatable tensioning rollers 9 that can be moved up and down between guide rollers 8. An individual tensioning cylinder 19 is associated with each steel wire 4. The working chamber of each cylinder 19, above the piston 18 thereof, communicates via a short flow connection 20 with a common pressure medium supply line 21. The pressure medium, either compressed air or oil under pressure, is supplied, in the direction of the arrow ∼ at a pressure that pulsates between two threshold values.

Between the guide rollers 8, the individual steel wires 4 that are tensioned between the friction roller systems form loops, with the lengths thereof differing and changing from wire to wire. The wires 4 are stretched to compensate for the pressure that acts equally upon all of the tensioning rollers 9. The application of pressure medium to the pistons 18 provides a common resilient cushion for the wires 4.

The present invention is, of course, in no way restricted to the specific disclosure of the specification and drawing, but also encompasses any modifications within the scope of the appended claims.

What we claim is:

1. A method of operating an apparatus for producing conveyer belts of elastomeric material in which are embedded cord or wire-like load-carriers that extend parallel to one another in a longitudinal direction without contacting one another; said method including the steps of:

providing means for jointly keeping said load-carriers under tension in a tension state within a lengthy portion of said apparatus;

disposing a plurality of tensioning cylinders near an input area of said lengthy portion of said apparatus, with each of said tensioning cylinders having a piston that is displaced by pressure medium, and with each of said pistons having a piston rod;

providing each of said piston rods with a tensioning roller that engages a respective one of said load-carriers; and applying a continously plusating pressure having a frequency between 5 Hz and 20 Hz, via said pressure medium, to said pistons of said tensioning cylinders so that always only a nominal sliding friction is present for said pistons in said cylinders, and so that greater binding static friction forces are avoided entirely.

2. A method according to claim 1, which includes the steps of providing said pressure medium with an essentially constant pressure, and applying said pulsating pressure as a function of the tension state of said load-carriers.

3. A method according to claim 2, which includes the step of producing pulsation of said pressure medium pressure as a consequence of deviations of tension measured in said load-carriers from a desired value.

* * * * *